US007523472B2

(12) United States Patent
D'Souza et al.

(10) Patent No.: US 7,523,472 B2
(45) Date of Patent: *Apr. 21, 2009

(54) METHOD AND SYSTEMS FOR DLL/COM REDIRECTION

(75) Inventors: David J. D'Souza, Mercer Island, WA (US); Seetharaman Harikrishnnan, Redmond, WA (US); Peter M. Wilson, Kirkland, WA (US); RoseMarie FitzSimons, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

This patent is subject to a terminal disclaimer.

(21) Appl. No.: 10/973,180

(22) Filed: Oct. 26, 2004

(65) Prior Publication Data

US 2005/0060725 A1    Mar. 17, 2005

Related U.S. Application Data

(63) Continuation of application No. 09/605,137, filed on Jun. 27, 2000, now Pat. No. 6,976,037.

(60) Provisional application No. 60/192,170, filed on Mar. 27, 2000.

(51) Int. Cl.
G06F 13/00 (2006.01)
(52) U.S. Cl. ...................... 719/331; 719/332
(58) Field of Classification Search ......... 717/162–165; 709/246, 305; 703/26; 713/200; 707/10, 707/102, 104, 203, 511; 719/331, 332
See application file for complete search history.

(56) References Cited

U.S. PATENT DOCUMENTS

| | | | | |
|---|---|---|---|---|
| 5,634,114 A | * | 5/1997 | Shipley | 717/170 |
| 5,659,751 A | * | 8/1997 | Heninger | 719/332 |
| 5,692,187 A | | 11/1997 | Goldman et al. | |
| 5,758,154 A | * | 5/1998 | Qureshi | 713/1 |
| 5,761,499 A | * | 6/1998 | Sonderegger | 707/10 |
| 5,835,749 A | * | 11/1998 | Cobb | 719/331 |
| 5,968,131 A | | 10/1999 | Mendez et al. | |
| 5,974,470 A | * | 10/1999 | Hammond | 719/331 |
| 6,018,747 A | | 1/2000 | Burns et al. | |
| 6,029,207 A | * | 2/2000 | Heninger | 719/331 |

(Continued)

OTHER PUBLICATIONS

Beginning Visual C++ 5. Ivor Horton, WROX, Mar. 19, 1997, pp. 7-48, 267-360, 715-734.*

(Continued)

*Primary Examiner*—Andy Ho
(74) *Attorney, Agent, or Firm*—Lee & Hayes, PLLC

(57) ABSTRACT

Methods, systems and data structure are described for implementing local isolated DLL and/or COM components. A version of a shared component is stored in a local directory with an application that uses that particular version. Another version of the shared component exists on the system and is useable by any number of other computer programs. A local file is created in the local directory that indicates the presence of an isolated version of the shared component. When the application calls the shared component, the system uses the isolated version of the shared component stored locally with the application program. Thus, specific versions of components may be provided to a calling application without making any code changes to the calling application or to the component to which the calling application is bound.

19 Claims, 2 Drawing Sheets

U.S. PATENT DOCUMENTS

| | | | |
|---|---|---|---|
| 6,035,121 A | 3/2000 | Chiu et al. | |
| 6,074,432 A | 6/2000 | Guccione | |
| 6,085,192 A | 7/2000 | Mendez et al. | |
| 6,086,623 A | 7/2000 | Broome et al. | |
| 6,154,878 A | 11/2000 | Saboff | |
| 6,185,734 B1* | 2/2001 | Saboff et al. | 717/164 |
| 6,205,579 B1 | 3/2001 | Southgate | |
| 6,209,000 B1 | 3/2001 | Klein et al. | |
| 6,256,773 B1 | 7/2001 | Bowman-Amuah | |
| 6,260,040 B1 | 7/2001 | Kauffman et al. | |
| 6,351,753 B1 | 2/2002 | Jagadish et al. | |
| 6,389,592 B1 | 5/2002 | Ayres et al. | |
| 6,401,117 B1 | 6/2002 | Narad et al. | |
| 6,401,239 B1 | 6/2002 | Miron | |
| 6,405,223 B1 | 6/2002 | Kelley et al. | |
| 6,484,315 B1 | 11/2002 | Ziese | |
| 6,618,735 B1* | 9/2003 | Krishnaswami et al. | 707/203 |
| 6,804,663 B1* | 10/2004 | Delo | 707/3 |
| 2002/0016921 A1 | 2/2002 | Olsen et al. | |
| 2002/0029227 A1 | 3/2002 | Multer et al. | |

OTHER PUBLICATIONS

IBM Dictionary of Computing, IBM, 1994, p. 225.*
Microsoft Press Computer Dictionary, Third Edition, Sep. 19, 1997, p. 166.*
Object-Oriented, Single -Source, On-line Documents, That Update Themselves, Susan Korgen, ACM, 1996, pp. 229-237.*
Linkers & Loaders, John R. Levine, Oct. 11, 1999, pp. 90, 177-182, 205-222.*
Advanced MS DOS, Ray Duncan, Microsoft Press, 1986, pp. 42-47.*
Sun Microsystems, "Designed to Evolve-Shared Libraries", Oct. 1998, 2 pages.
VA Linux Systems, "Linking" Feb. 28, 1996, pp. 1-6.
Wang et al., "Customization of Distributed Systems using COM", IEEE, 1998, pp. 8-12.

* cited by examiner

METHOD AND SYSTEMS FOR DLL/COM REDIRECTION

CROSS-REFERENCE(S) TO RELATED APPLICATION(S)

This U.S. Patent Application is a continuation application of prior U.S. application Ser. No. 09/605,137, entitled "Method and Systems for DLL/COM Redirection" and filed Jun. 27, 2000, now issued as U.S. Pat. No. 6,976,037 on Dec. 13, 2005; the prior U.S. application Ser. No. 09/605,137 claims the benefit of U.S. Provisional Application No. 60/192,170, entitled "DLL/COM Redirection"and filed on Mar. 27, 2000.

TECHNICAL FIELD

This invention relates to computer application programs and, more particularly, to DLL/COM (dynamic-link library/component object model) redirection in computer application programs that utilize shared components.

BACKGROUND

Modern operating systems and applications are built from many components. A component is a self-contained software entity, offering a set of functions that can be used broadly by a variety of applications. A component is typically code, but it may also include the registry state, support files, etc. Component sharing enables efficiencies since individual components are used by more than one application. This enables efficiencies attributable to not having to re-write and test redundant code. This allows a developer to distribute a product to market more quickly and provides more stable code (when done properly).

Successful global component sharing requires that any shared component function exactly like previous versions of that component. In practice, however, 100 percent backward compatibility is difficult if not impossible to achieve because of the difficulty in testing all configurations in which the shared component may be used. Both newer and older applications end up using the same component, and over time, fixing and improving the component becomes increasingly difficult.

As well, the practical functionality of a component is not easily defined. Applications may become dependent on unintended side effects that are not considered part of the core function of the component. For example, an application may become dependent on a bug in the component, and when the component developer chooses to fix that bug, the application fails. The sheer volume of applications that use each component only deepens the problem.

This lack of backwards compatibility can result in the inability to deploy a new application without breaking applications already deployed or compromising the functionality of the new application. Any new application requires a version of a shared component that is different from the version already deployed.

Component Sharing

Most, if not all, operating systems have long embraced the concept of sharing. All operating systems balance the need to provide a robust, full set of services against the resource constraints of the hardware for which the operating system was designed. Until recently, CPU usage and disk space were very tight resources on the PC platform. An obvious way to fit operating system and application code into a small space has been to share code as much as possible. Among many other benefits, code sharing improves the leverage of hardware resources and reduces the amount of code that must be tested.

Sharing is not always restricted to code. In WINDOWS operating systems by MICROSOFT CORPORATION, application and component state can be found throughout the operating system in the form of Registry state, application-specific data storage in the file system, and WINDOWS application program interfaces (API) that expose global namespaces. Such sharing provides for a high level of interoperability between applications produced by multiple software vendors, bringing cost reduction and heightened software efficiency.

However, there are costs to sharing. Sharing means that applications become interdependent upon one other, introducing an element of fragility. Changes to one component may produce unintended effects in other components. Typically, an application may become dependent on a particular version of a shared component. Another application may be installed with an upgraded (or downgraded) version of that shared component, and the first application may suffer from that change. In the extreme, applications that once worked well mysteriously start to function oddly, or even fail. This condition is often referred to by developers as "DLL Hell."

Isolation

The opposite of sharing in a system is isolation. Applications can be isolated by statically binding all resources and code into the application. However, complete isolation is not feasible today for applications that rely on COM components or any other globally stored system resources.

One solution discussed herein for reducing application fragility is to selectively isolate applications and components. Under this scenario, applications may all have access to the same component, but multiple versions of that component now become available. Component producers have the freedom to produce new versions of old components, making improvements and fixing bugs. Customers, on the other hand, can choose the version that fits with a particular application.

With components, the key is to provide the version that is appropriate to each application and isolate the different versions from each other. Further, with redirection, applications can be configured to use the component version that fits with that particular application, regardless of what other versions are currently deployed or will be deployed in the future. In addition, a developer may apply a bug fix to a component in the context of a single application without having to be concerned with the effect of the bug fix on other applications.

SUMMARY

The described implementations contemplate a new form of component sharing called side-by-side sharing, which uses selective isolation to minimize the problems associated with "DLL Hell." Side-by-side sharing allows multiple versions of the same component to run at the same time in different processes. Applications can then use a specific version of a component for which they were designed and tested, even if another application requires a different version of the same component. This arrangement allows developers to build and deploy more reliable applications because developers are able to specify the version of the component they will use for their application, independent of the other applications on the system.

It is noted that multiple versions of a side-by-side DLL may also be used in the same process. It is possible in an atypical case that different versions cannot be loaded at the same time because of the versions of the components were not designed to be truly side-by-side. Even then, this implementation provides value as different component versions may still be used in different processes albeit mutually exclusively.

A specific implementation described herein is DLL/COM redirection. Using this strategy, developers and administrators repackage existing applications and components so that the required versions of shared components are privatized to the application that needs them, each functioning side by side with other versions.

Implementations described herein focus on insulating existing applications from problems caused by other applications installing incompatible shared DLLs. Specific versions of components are deployed so that they are isolated to the applications that use them.

Applications that employ DLL/COM redirection use the versions of any shared components that are installed in the application directory, regardless of what versions are installed elsewhere on the system. To isolate an application, the application is stored in a directory with the shared component that is being isolated. In addition, a file having the same root name as the application together with an extension of ".local" is placed in the directory. This file may be blank (the contents are ignored), but its presence indicates that the system should use the local component when that component is called by the application.

The present invention allows applications to be reconfigured to install and run side-by-side without any code changes and without recompiling components. This allows system administrators who do not have access to the source code of an application to reconfigure a system to address DLL/COM compatibility problems.

Additional features and advantages of the invention will be made apparent from the following detailed description of illustrative implementations, which proceeds with reference to the accompanying figures.

BRIEF DESCRIPTION OF THE DRAWINGS

A more complete understanding of the various methods and arrangements of the present invention may be had by reference to the following detailed description when taken in conjunction with the accompanying drawings, wherein.

DETAILED DESCRIPTION

Figure 1:
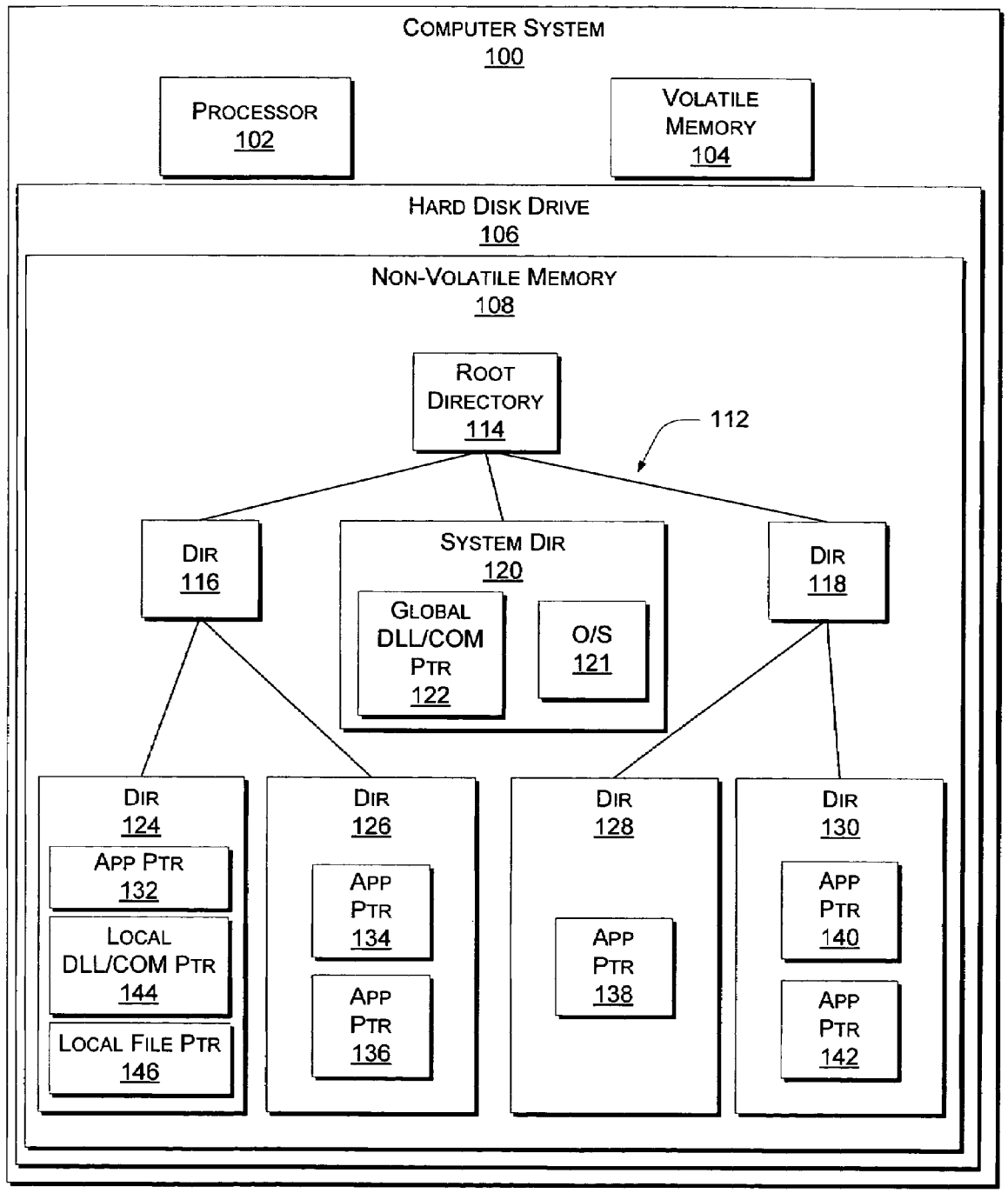
FIG. 1 is a block diagram generally illustrating a computer system that is suitable for use with the described implementations.

In the described implementations and illustrations, wherein like reference numerals refer to like elements, as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a computer system 100 having a processor 102 and volatile memory 104. The computer system 100 also includes a hard disk drive 106 that contains non-volatile memory 108.

A directory tree data structure 112 resides in the non-volatile memory 108. The directory tree 112 is a logical structure that allows for organization of programs and program components within the computer system 100. The directory tree 112 is a structure of file names and pointers. More specifically, the directory tree 112 contains the names and locations of all files that reside on a particular unit of mass storage; in this case, the non-volatile memory 108 of the hard disk drive 106.

The directory tree 112 includes several logical directories. By logical directory, it is meant that a directory in the directory tree 112 does not physically contain the data in the files 'contained' in that directory. Instead, each directory includes a file name of a file or sub-directory and a pointer that references the physical location of that particular data.

As shown in FIG. 1, a root directory 114 is stored at a highest level in the directory tree 112. The root directory 114 includes directory 116 and directory 118. Directories 116, 118 are represented on a second level, subordinate to the root directory 114. The root directory 114 also includes a system directory 120, which is similar to the other directories 116, 118, but which includes an operating system 121 and pointers to system files. In particular and as shown, the system directory 120 includes a Global DLL/COM Pointer 122 that references a location of a DLL/COM shared component.

A DLL (dynamic-link library) is a feature of the MICROSOFT WINDOWS family of operating systems and the OS/2 operating system that allows executable routines, generally servicing a specific function or set of functions—to be stored separately as files with DLL extensions and to be loaded only when needed by the program that calls it. A dynamic-link library has several advantages. First, because a DLL is loaded only when it is needed, it does not consume any volatile memory 104 until it is used. Second, because a DLL is a separate file, a programmer can make corrections or improvements to only that module without requiring recompilation of the calling program or any other DLL. Finally, because a DLL often contains a related function, a programmer can use the same DLL with other programs.

The component object model (COM) is a software architecture that allows components made by different software vendors to be combined into a variety of applications. COM defines a standard for component interoperability, but it is not dependent on any particular programming language. COM is available on multiple platforms and it is extensible. Since the word "object" tends to mean different things to different persons, this document refers to an object in COM as some piece of compiled code that provides some service to the rest of the system. To avoid confusion, reference will be made to a COM object as a 'component object' or simply a 'component.'

Directory 116 has two subordinate directories, directory 124 and directory 126. Directory 118 has is depicted as having two subordinate directories, directory 128 and directory 130. It is noted that, while directories 116, 118 are shown as having two subordinate directories each, any number of directories can branch from directories 116, 118.

The computer system 100 stores several application programs (not shown) in non-volatile memory 108. These application programs are registered with the operating system 121 and pointers to the application programs are stored in a directory of the directory tree 112. In the example given, directory 124 contains application pointer 132; directory 126 contains application pointer 134 and application pointer 136; directory 128 contains application pointer 138; and directory 130 contains application pointer 140 and application pointer 142. Although a limited number of application pointers are shown, virtually any number of computer application programs may be stored in the computer system 100 and registered in the operating system 121.

The present invention contemplates that when an application is deployed that utilizes a local version of a shared component rather than a global version of the same component, the executable application code and the isolated component(s) be installed into a same directory. This is shown in FIG. 1. A local DLL/COM pointer 144 is stored in directory 124, the same directory in which the application program pointer 132 is stored. The local DLL/COM pointer 144 references a local version of the shared DLL/COM component referenced by the global DLL/COM pointer 122. It is noted that, for discussion purposes, any reference made to installing (an application program, a local DLL/COM version, a local file, etc.) a program unit in a directory refers to storing a reference, or pointer, to the physical location of the program unit in the logical directory tree 112. Also, reference made to a program unit necessarily means a program unit referenced by a program unit pointer stored in the logical directory tree 112.

In addition to the application pointer 132 and the local DLL/COM pointer 144, a local file pointer 146 is deployed to the application directory. The local file pointer 146 references an empty file that has the same name as the application executable file, but having a ".local" extension added to it. Such deployment of the local file pointer 146 modifies the operating system 121 binding behavior, so that the application binds to the isolated (local) component rather than to the globally shared version.

Thus, the application referenced by the application pointer 132 will use a DLL/COM component that runs safely side by side with a different version of the same component that is referenced by a pointer installed elsewhere in the directory tree 112, such as in another application directory 126, 128, 130 or in the system directory 118. If another application on the computer system 100 requires a different version, the application referenced by the application pointer 132 remains unaffected and both applications execute properly with their respective versions of the component.

In an event that another application installs a new version of a component on the computer system 100, the version of the DLL/COM component referenced by the local DLL/COM pointer 144 remains unaffected, since it is installed it into directory 124, the same directory that contains application pointer 132. The application referenced by application pointer 132 continues to use the same version of the DLL/COM component installed locally with the application, while the other application uses its own version. It is noted that the operating system 121 can load both versions in the volatile memory 104 at the same time without affecting operation of the system as described herein.

It is noted that isolated DLL/COM components should be registered properly with the operating system 121 so that different versions of the DLL/COM component won't conflict with one another. In a WINDOWS operating system environment, such registration requires that while the implementation of the DLL/COM component can change between versions, such registered COM meta-data as CLSID, ProgID, Type Library, and Threading Model cannot change between versions.

Using DLL/COM Redirection

DLL/COM redirection allows a developer or administrator to selectively isolate existing components to the application they are building and deploying. This section discusses how to activate DLL/COM redirection, and how to select which components to isolate.

DLL/COM redirection is activated on an application-by-application basis by the presence of a ".local" file, which is referenced by the local file pointer 146 stored in directory 124. The ".local" file is an empty file in the same directory as the application's executable (.exe) file, with the same name as the application's executable file with ".local" appended to the end of the name.

For example, to activate DLL/COM redirection for an application called "myapp.exe," an empty file named "myapp.exe.local" is created and stored in the same directory where myapp.exe is installed, e.g., a pointer referencing myapp.exe.local is stored in the same directory as a pointer referencing myapp.exe.

Once DLL/COM redirection is activated, whenever the application loads a DLL or a COM component (.OCX file), the operating system 121 looks first for a pointer to the DLL or OCX in the same directory where a pointer to the executable file of the application is installed. If such a file is found, the operating system 121 then looks for a local version of a DLL/COM component. If a version of the DLL or COM component is found in the directory where the pointer to the executable code of the application is stored, the application uses that local version regardless of any directory path specified in the application or the registry (not shown) of the operating system 121. If a pointer to a version of the DLL or COM component is not found in the directory where the executable code of the application is installed, then a default search path or server path is used, and the application will utilize the global version of the DLL/COM component.

Figure 2:
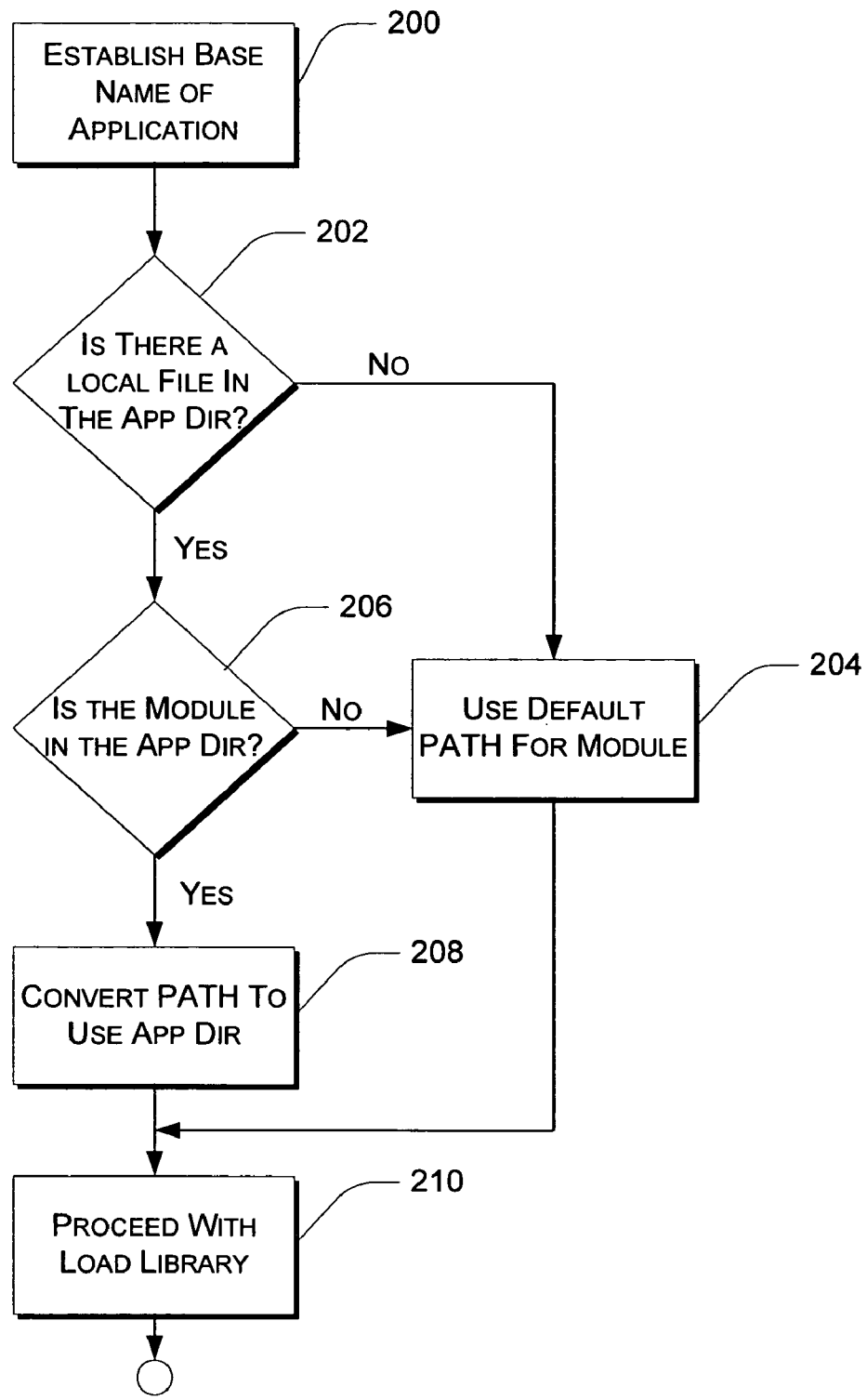
FIG. 2 is a flow diagram of a method for utilizing DLL/COM redirection in accordance with one described implementation.

FIG. 2 depicts a flow chart that describes a method according to one implementation of the present invention. For depiction and discussion purposes, reference to a program unit existing or being stored in a directory means that a pointer to the program unit is actually stored in a directory of the directory tree 112.

At step 200, a base name of the application (referenced by application pointer 132) is established. This may be accomplished by the operating system 121 or by the application program that is referenced by the application program pointer 132. The base name is the name of the application without an extension.

At step 202, a search is performed in the directory (directory 124) in which the application (application pointer 132) is stored, for a local file having a name identical to the base name of the application program (local file pointer 146). If such a file is not found ("No" branch, step 202), a default pathname is used to locate the DLL/COM component (step 204). The default pathname references the global component referenced by the global DLL/COM pointer 122, which results in the global DLL/COM being used by the application program. If such a file (or a pointer to this file) is found in directory 124 ("Yes" branch, step 202), then, at step 206, directory 124 is searched for a reference to the DLL/COM component used by the application (local DLL/COM pointer 144).

If a pointer to an isolated DLL/COM component is found in directory 124 ("Yes" branch, step 206), then the pathname utilized by the application is converted to use the DLL/COM component referenced by the local DLL/COM pointer 144 at step 208. If such a pointer is not located ("No" branch, step 206), then the global component referenced by the global DLL/COM pointer 122 is used (step 204). After making these determinations and setting the pathname, the load library routine proceeds at step 210.

As a more specific example, consider an application named "c:\myapp\myapp.exe" that calls a library loading routine ("LoadLibrary" in WINDOWS operating systems) using the pathname "c:\programfiles\commonfiles\system\mydll.dll." The directory ("c:\myapp") where the application resides is searched for a file named "myapp.exe.local." If that file is found, then the directory ("c:\myapp") is searched for an isolated, or local, version of "mydll.dll". If such a file is found in the directory, the library loading routine will load "c:\myapp\mydll.dll." Otherwise, the library loading routine will load the global version of the DLL/COM "c:\Windows\System\mydll.dll."

DLL/COM redirection allows the isolation of existing components where applications installed on a computer require different versions of the same component. No code changes are required to the component since, once activated, DLL/COM redirection changes the binding behavior of the operating system.

Until now, executing different versions of components side by side has not typically been a design consideration. While components can easily be installed side by side (installed in a shared location and isolated to one or more applications), they may not run side by side. This happens because some components use global state (such as settings stored in the registry), assuming that there will be only one version of the component on the computer at any time. Additionally, the component may make assumptions about the specific directory in which it is installed when locating other resources that it needs.

For this reason a developer utilizing the implementations described herein should test an application that uses isolated components—both installed on their own and installed in the context of the other applications from which the components are isolated. Experience has indicated that, in most scenarios, commonly shared components can run side by side, but in some cases it may be necessary to close one application before running the next.

CONCLUSION

The described implementations advantageously provide for an effective way to avoid reliance on a version of a shared DLL/COM component that may change, rendering an application inoperable. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer readable media including computer-executable instructions that, when executed on a computer system, perform the following steps:
storing:
a computer application program in a first logical directory of the one or more computer readable media;
a first version of a shared component that is a functional component of the computer application program in the first logical directory for execution with the computer application program on the computer system;
a pointer indicator in the first logical directory;
at least a second version of the shared component in a second logical directory of the one or more computer readable media; and
executing the computer application program on the computer system to use the first version of the shared component and not the second version of the shared component based on the pointer indicator being present in the first logical directory.

2. The computer system as recited in claim 1, wherein the computer-executable instructions of the one or more computer readable media includes a library loading routine that loads the first version of the shared component when the point indicator is present in the first logical directory.

3. The computer system as recited in claim 1, wherein the pointer indicator comprises at least a file name, the pointer indicator indicating to the computer application program that the first version of the shared component referenced by the pointer indicator is located in the first logical directory.

4. The computer system as recited in claim 3, wherein the pointer indicator comprises an empty file.

5. A method, comprising:
a step for calling a shared component in a computer system;
a step for searching for a local empty file when the shared component is called;
a step for detecting the local empty file that indicates the presence of a locally-stored version of the shared component, the local empty file being a different file than the shared component itself;
in response to detecting the local empty file in the step for detecting, a step for utilizing the locally-stored version of the shared component that is stored in a first directory of the computer system instead of a global version of the shared component stored in a second directory of the computer system; and
if the local empty file is not found in the step for searching, a step for utilizing the global version of the shared component.

6. A method, comprising:
a step for calling, by a computer application program, a pathname of a shared component in a computer system;
a step for detecting a local empty file that indicates the presence of a locally-stored version of the shared component, the local empty file being a different file than the shared component itself; and
in response to detecting the local empty file in the step for detecting, a step for utilizing the locally-stored version of the shared component that is stored in a first directory of the computer system instead of a global version of the shared component stored in a second directory of the computer system.

7. The method as recited in claim 6, further comprising:
in response to detecting the local empty file in the step for detecting, a step for converting the pathname of the shared component to a pathname referenced by the local empty file that indicates the presence of the locally-stored version of the shared component.

8. A computer system comprising:
first storage means for storing a computer application program in a first directory of the computer system that maintains a multiple-level directory structure;
second storage means for storing a local version of a shared component in the first directory for execution with the computer application program on the computer system;

third storage means for storing at least another version of the shared component in a second directory of the computer system; and execution means for executing the computer application program on the computer system to utilize the local version of the shared component and not the other version of the shared component.

9. The computer system as recited in claim 8, further comprising:

fourth storage means for storing a file in the first directory of the computer system that indicates the local version of the shared component is stored in the first directory.

10. The computer system as recited in claim 8, wherein the shared component stored in the computer system is a component object model (COM) component.

11. The computer system as recited in claim 8, wherein the shared component stored in the computer system is a dynamic-link library (DLL) component.

12. A computer system comprising:

a first directory that contains a pointer to a global version of a shared component useable by a plurality of computer programs; and a second directory that contains a pointer to an application program and a pointer to a local version of the shared component, the application program utilizing the local version of the shared component when the application program calls the shared component.

13. The computer system as recited in claim 12, wherein the second directory further includes an indicator that indicates the existence of the local version of the shared component.

14. The computer system as recited in claim 13, wherein the indicator includes a pointer to a file having a name of a pre-defined type.

15. The computer system as recited in claim 12, wherein the shared component is a component object model (COM) component or a dynamic-link library (DLL) component.

16. The computer system as recited in claim 12, wherein the first directory and the second directory comprise at least part of a directory tree data structure.

17. One or more computer readable media including computer-executable instructions comprising:

means for storing a computer application program in the one or more computer readable media;

means for storing a first version of a shared component that is a functional component of the computer application program in the one or more computer readable media for execution on a computer;

means for storing at least a second version of the shared component in the one or more computer readable media; and means for establishing a logical relationship between the computer application program and the first version of the shared component so that the computer application program uses the first version of the shared component and not the second version of the shared component when the computer application program is executed on the computer system, the means for establishing a logical including means for configuring a logical directory data structure that has multiple logical directories so that the computer application program and the first version of the shared component are referenced within a first logical directory, and wherein the second version of the shared component is referenced within a second logical directory.

18. The one or more computer readable media as recited in claim 17, wherein the second version of the shared component comprises a global version of the shared component.

19. The one or more computer readable media as recited in claim 17, wherein the one or more computer readable media include computer-executable instructions further comprising:

means for storing another computer application program in the one or more computer readable media;

wherein the means for establishing a logical relationship comprises means for establishing a logical relationship between the other computer application program and the second version of the shared component so that the other computer application program uses the second version of the shared component and not the first version of the shared component when the other computer application program is executed on the computer system; and wherein the means for establishing a logical relationship further includes means for configuring the logical directory data structure so that the other computer application program and the second version of the shared component are referenced within the second logical directory.

* * * * *

UNITED STATES PATENT AND TRADEMARK OFFICE
CERTIFICATE OF CORRECTION

PATENT NO. : 7,523,472 B2  Page 1 of 1
APPLICATION NO. : 10/973180
DATED : April 21, 2009
INVENTOR(S) : David J. D'Souza et al.

It is certified that error appears in the above-identified patent and that said Letters Patent is hereby corrected as shown below:

In column 1, line 13, delete "Redirection"and" and insert -- Redirection" and --, therefor.

Signed and Sealed this
Third Day of May, 2011

David J. Kappos
*Director of the United States Patent and Trademark Office*